United States Patent
Hatakeyama

(10) Patent No.: US 7,440,815 B2
(45) Date of Patent: Oct. 21, 2008

(54) VULCANIZED TIRE SIZE ALLOCATING METHOD, TIRE MANUFACTURING METHOD, AND VULCANIZING PROCESS SETTING METHOD

(75) Inventor: Kazuya Hatakeyama, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 499 days.

(21) Appl. No.: 10/536,195

(22) PCT Filed: Nov. 25, 2003

(86) PCT No.: PCT/JP03/15041

§ 371 (c)(1),
(2), (4) Date: May 24, 2005

(87) PCT Pub. No.: WO2004/048061

PCT Pub. Date: Jun. 10, 2004

(65) Prior Publication Data

US 2006/0036375 A1 Feb. 16, 2006

(30) Foreign Application Priority Data

Nov. 25, 2002 (JP) .............................. 2002-341212

(51) Int. Cl.
*G06F 19/00* (2006.01)
*B29C 35/00* (2006.01)

(52) U.S. Cl. .......................... 700/199; 700/99; 156/111

(58) Field of Classification Search ........... 700/99–102, 700/197–199; 156/60, 110.1, 111
See application file for complete search history.

(56) References Cited

U.S. PATENT DOCUMENTS

| | | | | | |
|---|---|---|---|---|---|
| 4,504,919 | A | * | 3/1985 | Fujii et al. | 700/228 |
| 4,542,466 | A | * | 9/1985 | Arimatsu | 700/199 |
| 5,820,885 | A | * | 10/1998 | Irie | 425/34.1 |
| 6,139,668 | A | * | 10/2000 | Stokes et al. | 156/111 |
| 6,702,912 | B1 | * | 3/2004 | Oku et al. | 156/110.1 |
| 7,195,047 | B2 | * | 3/2007 | Sieverding et al. | 156/396 |
| 7,281,916 | B2 | * | 10/2007 | Ito et al. | 425/34.1 |
| 2004/0137099 | A1 | * | 7/2004 | Oku et al. | 425/34.1 |
| 2004/0234637 | A1 | * | 11/2004 | Ito et al. | 425/34.1 |
| 2004/0238102 | A1 | * | 12/2004 | Girard et al. | 156/111 |
| 2005/0126684 | A1 | * | 6/2005 | Sieverding et al. | 156/111 |
| 2006/0219348 | A1 | * | 10/2006 | Girard et al. | 156/111 |

FOREIGN PATENT DOCUMENTS

| | | | |
|---|---|---|---|
| EP | 448407 | A2 * | 9/1991 |
| EP | 0 922 561 | A | 6/1999 |
| JP | 63-209906 | A | 8/1988 |
| JP | 2003-53732 | A | 2/2003 |
| WO | WO 01/39963 | A | 6/2001 |
| WO | WO 03/013818 | A1 | 2/2003 |

* cited by examiner

*Primary Examiner*—M. N. Von Buhr
(74) *Attorney, Agent, or Firm*—Sughrue Mion, PLLC

(57) ABSTRACT

A family of tire sizes are classified into plural groups every tact time and only sizes belonging to the same group are selected from the family of tire sizes and allocated in a plurality of vulcanization stations vulcanizing tires, whereby tires of plural sizes can be vulcanized at a mixed state for a given tact time without requiring middle stock for green tires.

7 Claims, 3 Drawing Sheets

FIG. 1

| Vulcanization station | Allocation 1 | Allocation 2 | Allocation 3 | Allocation 150 | Allocation 151 | Allocation 152 |
|---|---|---|---|---|---|---|
| 1 | $FA_1$ | $FA_1$ | $FA_1$ | $FA_3$ | $FB_1$ | $FB_1$ |
| 2 | $FA_2$ | $FA_6$ | $FA_6$ | $FA_{10}$ | $FB_3$ | $FB_2$ |
| 3 | $FA_3$ | $FA_3$ | $FA_4$ | $FAX_5$ | $FB_{10}$ | $FB_{10}$ |
| 4 | $FAX_{m1}$ | $FAX_{m1}$ | $FAX_{m1}$ | $FAX_2$ | $FBX_1$ | $FBX_1$ |

VULCANIZED TIRE SIZE ALLOCATING METHOD, TIRE MANUFACTURING METHOD, AND VULCANIZING PROCESS SETTING METHOD

TECHNICAL FIELD

This invention relates to a size allocating method in the vulcanization of tires, a method of producing a tire and a setting method of a vulcanization process, and more particularly to a method capable of efficiently vulcanizing tires of a plurality of sizes.

BACKGROUND ART

In a vulcanization system for vulcanizing a plurality of tire sizes, in order to achieve a high productivity, there has hitherto been conducted a method wherein tires are vulcanized in a plurality of vulcanization machines for a shortest vulcanizing time for each tire size. According to this method, however, if the size of the tire to be vulcanized in the vulcanization machine differs, the vulcanizing time differs, so that a tact time differs for each vulcanization machine. This is problematic because even if green tires are shaped at a constant tact time, a vast middle storage space for the green tires is necessary between the tire shaping system and the tire vulcanizing system to prevent the lack of stock of the green tires.

The invention has been made considering the above problem and provides a size allocating method for tire vulcanization capable of efficiently vulcanizing at a constant tact time without requiring the middle storage for the green tires even if tires of a plurality of sizes are mixed, and a method of producing tires as well as a setting method of a vulcanization process.

DISCLOSURE OF THE INVENTION

The invention is made for achieving the above object and the summary and construction thereof are as follows.

<1> A method of allocating tire size in tire vulcanization in which a tire size to be vulcanized is allocated in each vulcanization station of a vulcanization system having a plurality of vulcanization stations and vulcanizing tires of a previously specified family of tire sizes, wherein when a plurality of tact times are previously set on the vulcanization system and only tire sizes having a vulcanizing time compatible with each tact time are collected to form a plurality of groups specified by the tact time and tire sizes belonging to the same group among the above specified family are selected to allocate in each vulcanization station, tire sizes are made different in at least two vulcanization stations at any size allocation among a series of size allocations renewed at each changeover of size.

According to the invention, the size allocation is carried out by selecting only the tire sizes belonging to the group corresponding to one tact time, so that the tires can be vulcanized in synchronization with the tire shaping step while making the tact time constant and the middle storage for the green tires can be controlled. Also, the tire sizes are made different in at least two vulcanization stations at any size allocation, so that tires having a plurality of sizes can be vulcanized at a mixed state.

<2> The invention according to the item <1> is a size allocating method in tire vulcanization, wherein a unity vulcanizing time is set as a standard vulcanizing time compatible with a tact time for each tact time and a tire size capable of vulcanizing at the unity vulcanizing time is included in the group in correspondence to the tact time and also a tire size capable of vulcanizing at a vulcanizing time of not more than Tp represented by the following equation (A) even in tire sizes not vulcanizing at the unity vulcanizing time is included in the group in correspondence to the tact time:

$$Tp = TT \times N - t \quad (A)$$

wherein TT, N and t are as follows.

TT: tact time in correspondence with each of the groups

N: number of vulcanization stations in the vulcanization system t: total of a time required for charging a tire of a target size into the vulcanization station and a time required for discharging the tire from the vulcanization station According to this invention, even in tire sizes not vulcanizing for the unity vulcanizing time, if tires have a size capable of vulcanizing at a vulcanizing time of not more than Tp represented by the equation (A), they are included in the same group, so that a greater number of tires can be produced in a short cycle time.

<3> The invention according to the item <1> or <2> is a size allocating method in tire vulcanization, wherein the group includes at least two tire sizes having different vulcanization temperatures.

According to this invention, the sizes having different vulcanizing temperatures are included in one group, so that a greater number of sizes can be packed in one group and the production of multi-size mixed tires can be carried out efficiently.

<4> The invention according to any one of the items <1>-<3> is a size allocating method in tire vulcanization, wherein the family of tire sizes is classified into 2-6 groups.

According to this invention, the number of the groups is 2-6, so that the vulcanization can be conducted efficiently. When the number of groups is 1, the range of sizes targeted in the vulcanization system should be made small and hence the ability of the system corresponding to the sizes is narrowed, while when the number of groups exceeds 6, the changeover between the groups becomes large and the loss due to the stopping of the system between the changeovers can not be ignored.

<5> The invention is a method of producing a tire by vulcanizing a tire based on the size allocating method according to any one of the items <1>-<4> in which the tire is vulcanized at a tact time corresponding to the respective size allocation.

According to this invention, the tire is vulcanized at a constant tact time based on the aforementioned size allocating method, so that even if a plurality of tire sizes are produced at a mixed state, the tires can be vulcanized in synchronization with the tire shaping step to control the middle storage for the green tires.

<6> The invention according to the item <5> is a method of producing a tire, wherein the tire is shaped at the same tact time as the given tact time of the vulcanization system vulcanizing the tire.

According to this invention, the tact time is made same between the vulcanization system and the shaping system, so that the middle storage for the green tires can be controlled.

<7> The invention is a method of setting a vulcanization process, in which in case of setting the vulcanization process for tires produced by the production method described in the item <5> or <6>, a vulcanizing time is first set and then a vulcanizing temperature is set based on the vulcanizing time.

According to this invention, the vulcanizing time is first set, so that the vulcanizing time can be set so as to correspond to the same tact time on various sizes to conduct the size allocation comprising many different sizes and the multi-size mixed production can be carried out efficiently.

BRIEF DESCRIPTION OF THE DRAWINGS

FIG. 1 is a diagram illustrating an embodiment of size allocation.

BEST MODE FOR CARRYING OUT THE INVENTION

Figure 2:
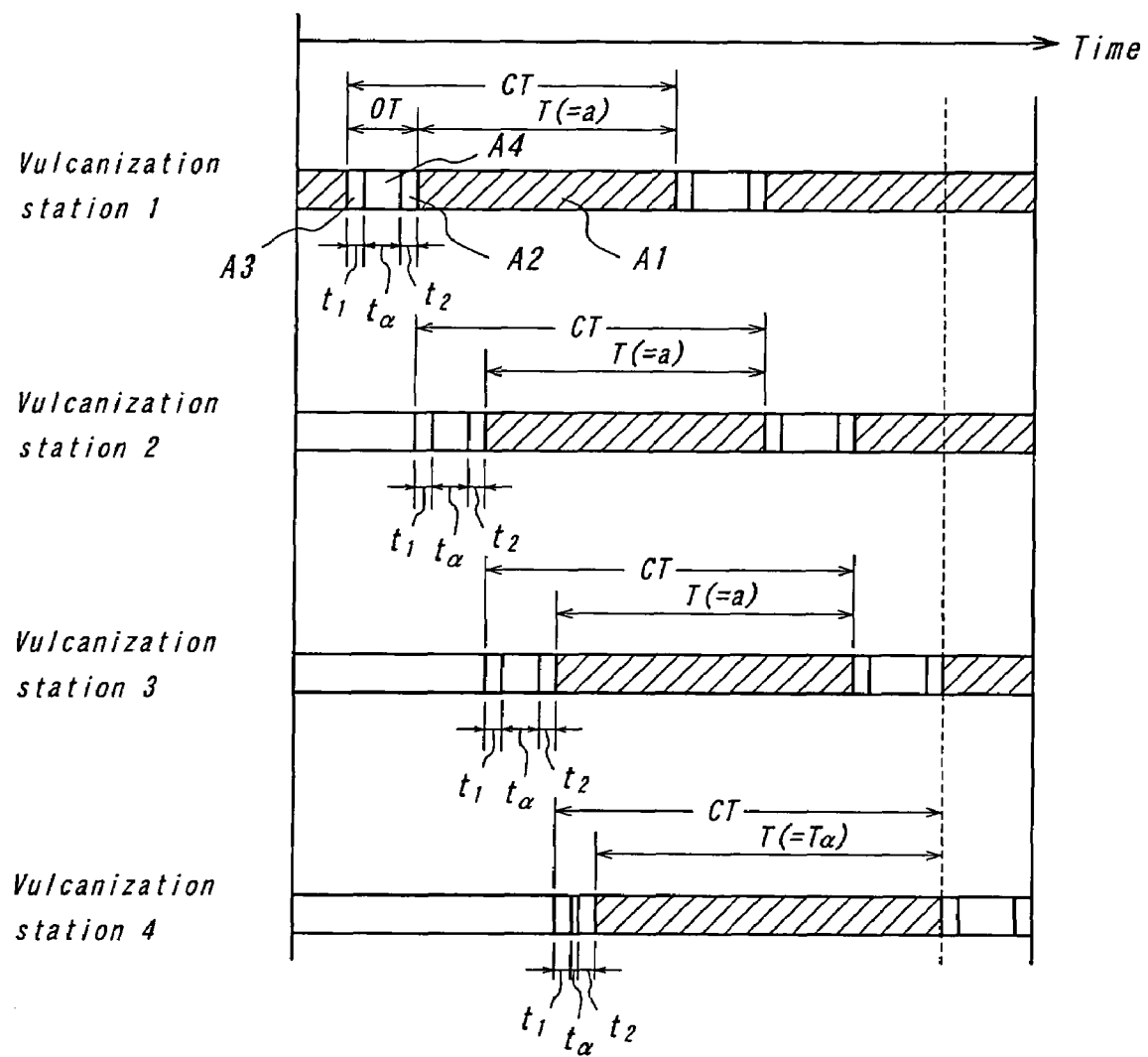
FIG. 2 is a time chart of a vulcanization system corresponding to a certain allocation.

Embodiments of the invention will be described with reference to FIGS. 1 and 2. Moreover, the "size allocation" used herein means the arrangement of tire sizes to be vulcanized in each of the vulcanization stations in the planning of the production. Also, the "vulcanizing time" means a time from the closing of a vulcanization mold receiving an uncured tire to opening the vulcanization mold. Furthermore, the vulcanization process comprises vulcanization conditions defined in the production of a tire having a certain size such as vulcanizing time, vulcanizing temperature, pressure inside bladder, a mold applied and the like. The "vulcanizing temperature" used herein means a highest temperature defined in the vulcanization process among temperatures set in a heating apparatus for vulcanizing the tire, and the temperature set in the heating apparatus means a set temperature of an electric heater or the like as the heating apparatus or a set temperature of a heating fluid when the heating of the heating apparatus is conducted by passing the heating fluid through a platen or the like.

The vulcanization system illustrated in this explanation comprises four vulcanization stations and one mold opening-closing station. The mold opening-closing station repeats an operation on the respective vulcanization station. A mold taken out from the vulcanization station is opened to take out a vulcanized tire from the mold, an uncured tire is placed in the mold, the mold is closed, and then the mold is returned to the vulcanization station.

Table 1 shows a family of tire sizes targeted in the vulcanization system for every group. The family of tire sizes to be vulcanized in this system is classified into three groups FA, FB and FC, each of which is constituted with a plurality of different sizes. For example, the group FA comprises (n1+m1) sizes of size $FA_1, FA_2, \ldots FA_{n1}$ and $FAX_1, FAX_2, \ldots, FAX_{m1}$. In the sizes of $FA_1$-$FA_1$, the vulcanizing time is a-minutes, while the vulcanizing time in the sizes of $FAX_1$-$FAX_{m1}$ exceeds a-minutes. Among these sizes, the vulcanizing temperature differs between at least the sizes $FA_1$ and $FA_{n1}$. The sizes $FA_1$-$FAX_{m1}$ are arranged in order of increasing vulcanizing temperature.

TABLE 1

| Group | Size |
|---|---|
| FA | $FA_1, FA_2, \ldots, FA_{n1}, FAX_1, \ldots, FAX_{m1}$ |
| FB | $FB_1, FB_2, \ldots, FB_{n1}, FBX_1, \ldots, FBX_{m1}$ |
| FC | $FC_1, FC_2, \ldots, FC_{n1}, FCX_1, \ldots, FCX_{m1}$ |

Similarly, the vulcanizing time corresponding to $FB_1$-$FB_{n2}$ is b-minutes and the vulcanizing time corresponding to $FC_1$-$FC_{n3}$ is c-minutes, while the vulcanizing time in the sizes $FBX_1$-$FBX_{m2}$ exceeds b-minutes and the vulcanizing time in the sizes $FCX_1$-$FCX_{m3}$ exceeds c-minutes. Also, these sizes are arranged in order of increasing vulcanizing temperature. For the sake of convenience in the following explanation, a shortest vulcanizing time in the group is called a unity vulcanizing time of the respective group. That is, the unity vulcanizing times of the groups FA, FB, FC are a-minutes, b-minutes and c-minutes, respectively.

When the feature of the grouping is explained in the above embodiment, each of the groups is classified so as to include at least two sizes being the same in the vulcanizing time and different in the vulcanizing temperature. For example, in the sizes $FA_1$ and $FA_1$ of the group FA, the vulcanizing time is a-minutes, but the vulcanizing temperature of $FA_1$ is lower than the vulcanizing temperature of $FA_{n1}$. The tires of size $FA_1$ were vulcanized in the conventional production method, in which the vulcanizing time is set to a shortest one for each size, based on such a vulcanization process that the vulcanizing temperature is as high as that of $FA_1$ and the vulcanizing time is shorter than a-minutes.

The degree of vulcanization determining the quality of the tire is dependent upon both of the vulcanizing time and the vulcanizing temperature. In a given temperature range, many combinations of both factors yield the same degree of vulcanization. In the invention different from the conventional determining method for the vulcanization process, there is an essential feature that a vulcanizing time for a given size is first determined and then a vulcanizing temperature is determined from a vulcanization degree most suitable for tires of this size to set the vulcanization process for such a size. In this way, the vulcanization process is determined, whereby the vulcanizing time can be classified into three groups having the respective unity vulcanizing times as in the above embodiment though the vulcanizing time is different for each size in the conventional technique. Thus, the sizes in the same group are allocated in each of the vulcanization stations to make the tact time constant, whereby the middle storage can be decreased.

The procedure of grouping the family of tire sizes into a plurality of groups as mentioned above is as follows. At first, a plurality of possible tact times in the vulcanization system capable of vulcanizing tires in synchronization with the tire shaping step are set considering the production capability of the tire shaping step. Then, tire sizes of vulcanizing time compatible with the tact time are collected and grouped in a family of tire sizes as the feature of grouping according to the invention. Even in the same size, if the vulcanizing time is short, some of these tact times can be compatible, and hence there can be taken some grouping methods, but the following grouping is preferable.

That is, the unity vulcanizing time as previously mentioned is set for each tact time as a standard vulcanizing time compatible with such a tact time. Then, groupings are made starting with a group corresponding to a short tact time. Tire sizes capable of setting the vulcanizing time to the unity vulcanizing time corresponding to the tact time are included in the group. In this case, even if a tire size is set to only a vulcanizing time longer than the unity vulcanizing time corresponding to a certain tact time, a size having a vulcanizing time compatible with the tact time, i.e. a size having a vulcanizing time of not more than Tp in the aforementioned equation (A) is included in a group corresponding to such a tact time.

Thus, a greater number of tire sizes can be included in a group corresponding to a short tact time to enhance the productivity of the vulcanization.

FIG. 1 is a diagram illustrating size allocations on the four vulcanization stations in the above vulcanization system. Allocation 1-Allocation 150 allocate sizes of group FA to each vulcanization station, and Allocation 151 or later allocate sizes of group FB to each vulcanization station. In Allocation 1, $FA_1$, $FA_2$, $FA_3$ and $FAX_{m1}$ are allocated to vulcanization stations 1, 2, 3, 4, respectively. In Allocation 2, the size in the vulcanization station 2 is changed over to $FA_6$, and then the size of the vulcanization station 3 is changed over to $FA_4$ in Allocation 3. In this way, the allocation is transited to a new one for each changeover of the size at any vulcanization station. Also, the sizes selected from the same group FA are changed over up to Allocation 150. At Allocation 151, sizes of group FB are allocated to all of the vulcanization stations, and thereafter sizes selected from the same group FB are changed over.

FIG. 2 is a time chart showing a timing of an operation made in each of the vulcanization stations at the vulcanization system conducted by a certain size allocation. Operation A1 represents the vulcanization of a tire, A2 represents the charging of the tire including the placing of an uncured tire in a vulcanization mold and the closing of the mold, A3 represents the discharge of the tire including the opening of the mold and take-out of a vulcanized tire from the mold, and A4 represents non-operation of a state conducting no operation in the vulcanization station. In the vulcanization system, in order to decrease the middle storage, this vulcanization system operates in synchronization with the shaping system at a constant tact time TT determined from a tact time of the shaping. That is, it is required to discharge one vulcanized tire every tact time TT. When the number of the vulcanization stations is N, a time of one cycle at a series of operation at the respective vulcanization station, i.e. a cycle time CT should be a constant time obtained by multiplying tact time TT and N.

In the conventional production method, the cycle time CT in each of the vulcanization stations can not be made constant because the vulcanizing times are all different for each size. In the invention, however, the cycle time CT can be made constant by allocating tire sizes belonging to the same group to the respective vulcanization station. This is described below. When the time chart of FIG. 2 is corresponded to Allocation 1, the vulcanization station 1 vulcanizes a tire of size $FA_1$ in which the vulcanizing time T is a unity vulcanizing time of a-minutes and leaves a time to of non-operation A4 as shown in the figure, so that the operation of one cycle can be completed at a cycle time CT in good time. That is, when the unity vulcanizing time of the allocated group FA is shorter than a time obtained by subtracting a total time $(t_1+t_2)$ required for the charge of tire A2 and discharge of tire A3 from the cycle time CT, the operation can be continued at a constant cycle time CT.

On the other hand, the vulcanization station 4 vulcanizes a tire of size $FAX_{m1}$ belonging to the group FA but having a vulcanizing time Tax longer than the unity vulcanizing time of a-minutes. Even in this case, since a time obtained by adding $(t_1+t_2)$ to $T_\alpha$ is shorter than the cycle time CT, the vulcanization system can be operated without destroying the constant cycle time CT even when the size $FAX_{m1}$ is allocated together with the size such as $FA_1$ or the like having a process of the unity vulcanizing time in the group FA. That is, even when the vulcanizing time is longer than the unity vulcanizing time, tires having a vulcanizing time shorter than a time obtained by subtracting the total time required for the charge and discharge of the tire $(t_1+t_2)$ from a multiplied value of the tact time TT of the vulcanization system and the number of vulcanization stations N can be included in the same group, and hence sizes of a wider range can be grouped in one group to cover the given size range with a limited group.

Although the number of vulcanization stations is 4 and the number of tact times or groups is 3 in the above explanation, similar size allocations can be conducted even in the numbers other than the above and the similar effects can be obtained.

Figure 3:
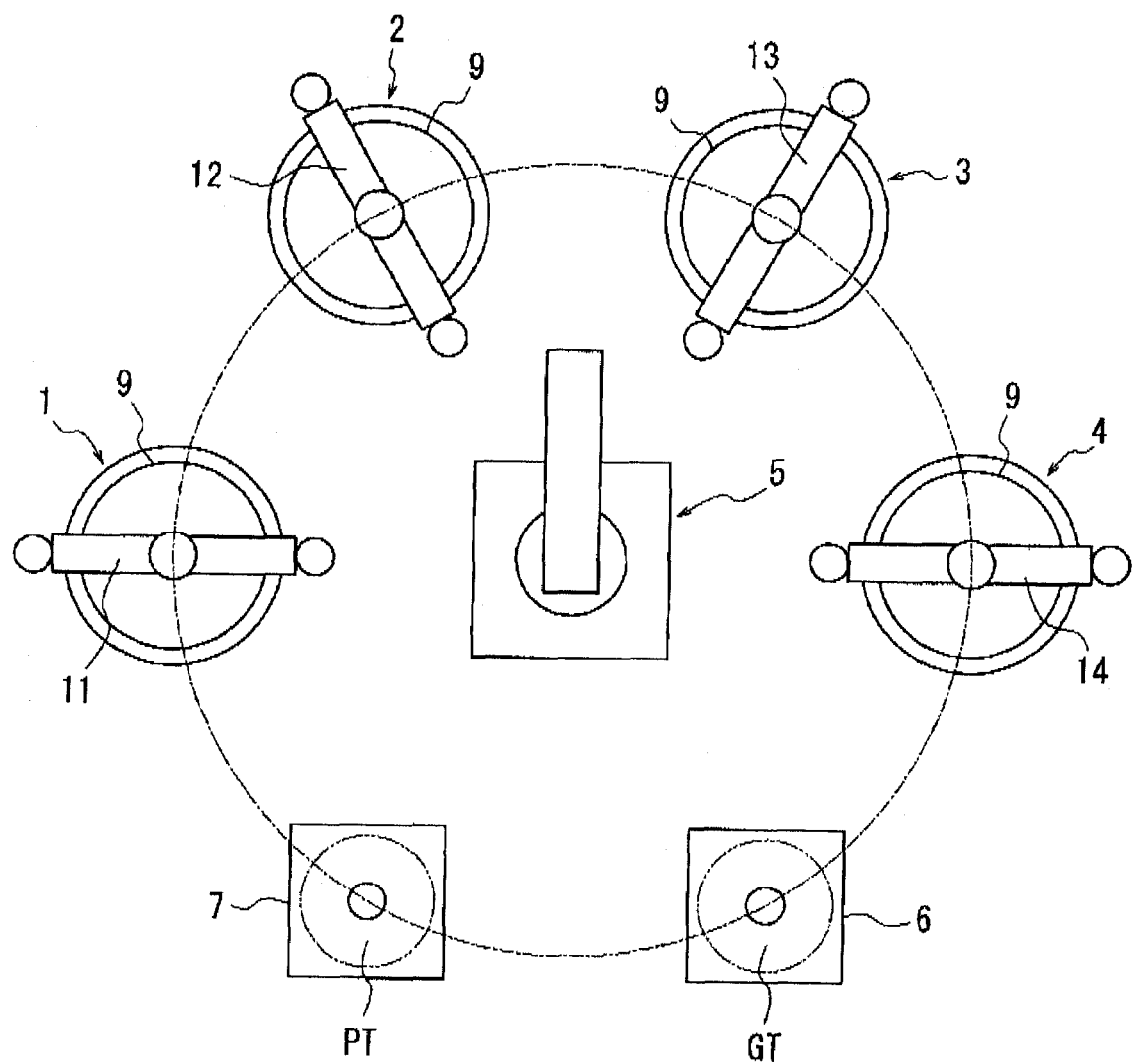
FIG. 3 is a schematic plan view of a vulcanization system according to an embodiment of the invention.

FIG. 3 is a schematic plan view of a vulcanization system according to an embodiment of the invention.

The illustrated vulcanization system comprises four vulcanization stations 1-4 and four mold opening-closing stations 11-14 disposed above the respective vulcanization stations 1-4. In each of the mold opening-closing stations 11-14, a vulcanization mold 9 disposed in the respective vulcanization station is opened to take out a cured tire PT from the mold through a transfer equipment 5, while an uncured tire GT is placed in the mold through the transfer equipment 5 and then the mold is closed.

When the vulcanization molds 9 are disposed in the respective vulcanization stations 1-4, for example, in case of Allocation 1, a vulcanization mold corresponding to a size of $FA_1$ is disposed in the vulcanization station 1, and a vulcanization mold corresponding to a size $FA_2$ is disposed in the vulcanization station 2, and a vulcanization mold corresponding to a size of $FA_3$ is disposed in the vulcanization station 3, and a vulcanization mold corresponding to a size of $FAX_{m1}$ is disposed is the vulcanization station 4, respectively.

The transfer equipment 5 is operated in such a manner that the cured tire PT is taken out from the opened vulcanization mold and transferred into a cured tire platform 7, while the uncured tire GT is transferred from an uncured tire platform 6 into the opened vulcanization mold in each of the vulcanization stations 1-4. On the other hand, an uncured tire GT is transported from a shaping step to the uncured tire platform 6 at a given cycle time CT, while the cured tire PT is transported from the cure tire platform 7 to a subsequent step at a given cycle time CT.

INDUSTRIAL APPLICABILITY

As seen from the above, since the vulcanizing times are all different for each size in the conventional production method, when a plurality of tire sizes are allocated, the vulcanization can not be carried out at a constant cycle time and hence a vast middle storage for green tires is required. In the invention, sizes capable of completing the operation of one cycle in the same cycle time are summed up in one group and the size allocation is carried out so as to make sizes in each of the vulcanization stations belonging to the same group, so that the vulcanization can be conducted at a constant cycle time and the middle storage can be made approximately zero by synchronizing with the tire shaping system.

The invention claimed is:

1. A method of allocating tire size in tire vulcanization, comprising:

allocating a tire size to be vulcanized in each vulcanization station of a vulcanization system having a plurality of vulcanization stations; and vulcanizing tires of a previously specified family of tire sizes;

wherein plurality of tact times are previously set on the vulcanization system and only tire sizes having a vulcanizing time compatible with each tact time are collected to form a plurality of groups specified by the tact time;

wherein tire sizes belonging to the same group among the above specified family are selected to allocate in each vulcanization station: and wherein tire sizes are different in at least two vulcanization stations at any size allocation among a series of size allocations renewed at each changeover of size.

2. A method of allocating tire size in tire vulcanization according to claim 1, wherein a unity vulcanizing time is set as a standard vulcanizing time compatible with a tact time for each tact time;

wherein a tire size capable of vulcanizing at the unity vulcanizing time is included in a group among the plurality of groups specified by the tact time and also a tire size capable of vulcanizing at a vulcanizing time of not more than Tp is included in the group among the plurality of groups specified by the tact time; and wherein $Tp=TT \times N-t$ and TT is a tact time corresponding to each of the groups, N is a number of vulcanization stations in the vulcanization system, and t is a total of a time required for charging a tire of a target size into the vulcanization station and a time required for discharging the tire from the vulcanization station.

3. A method of allocating tire size in tire vulcanization according to claim 1, wherein each group among the plurality of groups specified by the tact time includes at least two tire sizes having different vulcanization temperatures.

4. A method of allocating tire size in tire vulcanization according to claim 1, wherein the family of tire sizes is classified into 2-6 groups.

5. A method of producing a tire by vulcanizing a tire based on the size allocating method according to claim 1, wherein the tire is vulcanized at a tact time corresponding to a respective size allocation.

6. A method of producing a tire according to claim 5, wherein the tire is shaped at the same tact time as the tact time corresponding to the respective size allocation of the vulcanization system vulcanizing the tire.

7. A method of setting a vulcanization process for tires produced by the production method as claimed in claim 5, comprising:

setting a vulcanizing time; and setting a vulcanizing temperature based on the previously set vulcanizing time.

* * * * *